No. 626,882. Patented June 13, 1899.
E. B. BADLAM.
FLUSHING TANK FOR CLOSETS.
(Application filed Feb. 2, 1898.)

(No Model.)

Witnesses,

Inventor
Edgar B. Badlam.
By Dewey Strong & Co.
Atty

UNITED STATES PATENT OFFICE.

EDGAR B. BADLAM, OF SAN FRANCISCO, CALIFORNIA.

FLUSHING-TANK FOR CLOSETS.

SPECIFICATION forming part of Letters Patent No. 626,882, dated June 13, 1899.

Application filed February 2, 1898. Serial No. 668,828. (No model.)

*To all whom it may concern:*

Be it known that I, EDGAR B. BADLAM, a citizen of the United States, residing in the city and county of San Francisco, State of California, have invented an Improvement in Flushing-Tanks for Closets; and I hereby declare the following to be a full, clear, and exact description of the same.

My invention relates to an improvement in flushing-tanks which are especially adapted for use in conjunction with water-closets and other apparatus where it is desired to periodically discharge a definite body of water for the purpose of flushing the apparatus.

It consists of the parts and the constructions and combinations of parts hereinafter described and claimed.

Figure 1:
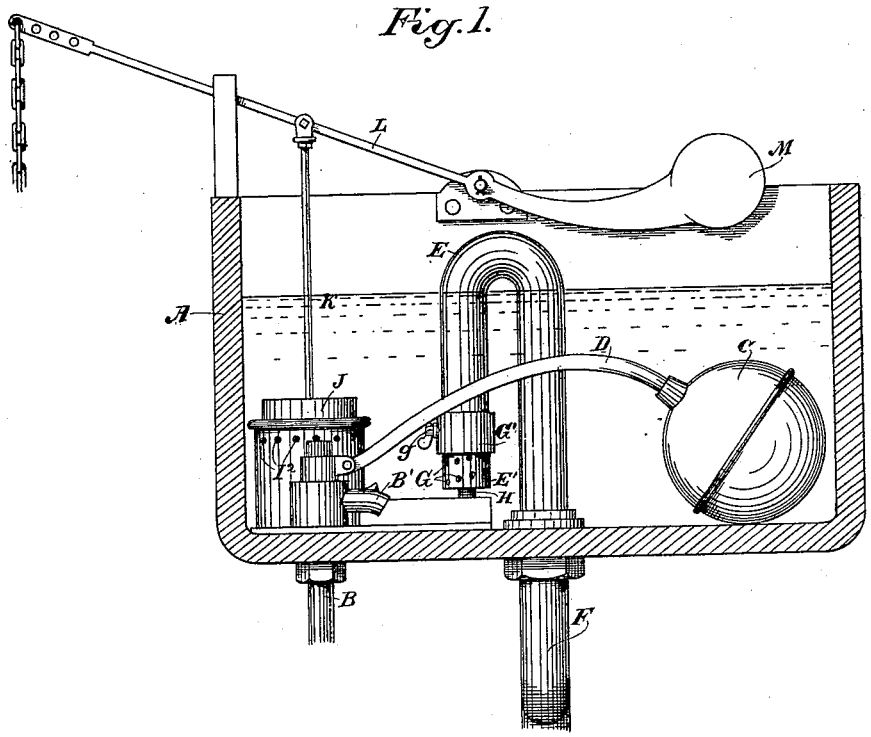
Figure 2:
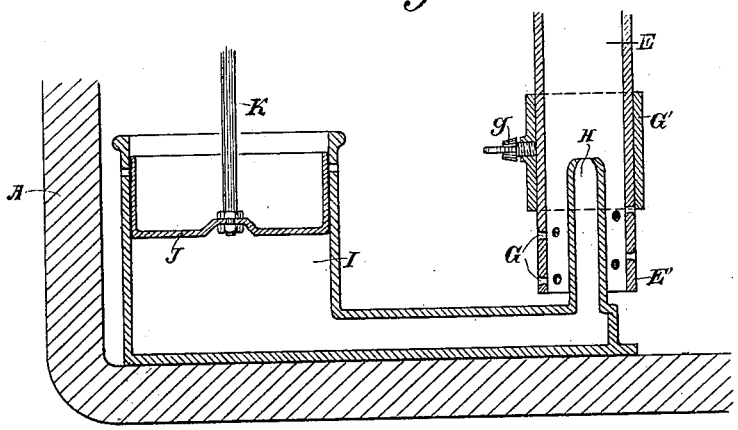

Figure 1 is a sectional view showing the interior of the tank and its attachments. Fig. 2 is a sectional view of the siphon and a means of starting the flow of water therefrom.

In this class of apparatus various devices have been employed to discharge a definite body of water (periodically) for flushing purposes, such devices either employing one or more valves, which are liable to get out of order, or a jet discharged into the outlet side of the siphon for the purpose of forming a vacuum whereby the body of water from within the tank is caused to flow over the top of the curve, and thus start the flow of the siphon, or a jet is connected directly with a supply-main, which may have a high or a variable pressure. In my invention I have devised a means by which the flow is started from the inlet side of the siphon by direct manually-operated pressure instead of by the aid of a vacuum and by means of devices in which no valves of any description are employed, the device acting as an ejector which is primarily charged by the starting mechanism, and the supply is thereafter continued from said mechanism and from the tank until the latter is exhausted.

A is a tank of any usual or suitable form and description.

B is an inlet-pipe through which the water is supplied, having a delivery-nozzle B' within the tank. The flow of water is controlled by means of a float C, having an arm D connecting with and actuating a valve of any well-known description, which controls the passage through the inlet-pipe and its nozzle B', so that when the float C is at the bottom of the tank the valve will be opened and the flow of water unimpeded, and when the float has risen to near the top of the tank it will actuate the valve and close it to prevent further inflow of water.

E is a siphon-pipe the upper curve of which is normally above the surface of the water within the tank, and one arm of said pipe connects with the discharge-pipe F. The other and short arm terminates, as here shown, in a mouth E', the lower edge of which is raised above the bottom of the tank as much as may be desired, so that when the water within the tank has been siphoned out until it reaches this lower edge the air will enter and no more water will be drawn from the tank. In order to prevent the disagreeable noise caused by the entrance of air into pipes of the ordinary description, I have shown the bottom of this pipe as made with a series of suitably-shaped openings G, arranged spirally or in other suitable manner, so that as the water begins to reach these openings the air will be admitted a little at a time until sufficient air enters to stop the siphon flow. A sleeve G' is slidable upon the pipe E and is held in position by a set-screw g, and this sleeve is set to expose any number of the holes, depending upon the pressure in the outer siphon-leg, and to thus gradually admit air and break the siphon action noiselessly. I have found this device to be efficient in preventing the noise caused by the entrance of the air in the usual manner when there is a powerful siphon action. The result here described is further assisted by also admitting air through the starting-cylinder, as will be hereinafter described.

In order to start the flow of the siphon, I have shown a jet-pipe H discharging upwardly essentially in line with the short arm of the siphon E, so that whenever a jet of water is forced through this pipe it acts as an injector to carry a body of water over the curve of the siphon until a sufficient weight of water has passed into the discharge-leg to insure a continuous flow thereafter as long as water is supplied to the siphon. As the bottom of the short leg of the siphon opens within the tank and below the surface of the water, it will be seen that the action of the jet will draw water from the tank in addition to its own supply, and thus charge the siphon and continue to supply it until the tank is exhausted.

In order to avoid the use of valves or cocks for the purpose of producing this flow, I have devised a means which consists, as here shown, of a cylinder I of considerable diameter, having a loosely-fitting plunger J movable vertically within it, said plunger having a stem K, which connects with the lever-arm L, suitably fulcrumed with relation to the tank and having the outer end, projecting beyond the tank, adapted to connect with the cord or chain, which, extending within reach of the user, enables him to pull the lever, or it may be operated by any equivalent means. The cylinder I is open at the top and is of sufficiently less depth than that of the water which fills the tank so that it will be submerged when the tank fills. The water flowing over the top of the cylinder will pass down around the plunger J and fill the space below the plunger, which normally stands at or near the top of the cylinder. The plunger is normally thus raised by the action of a spring or counterweight M or other suitable contrivance located at a convenient point with relation to the device. Holes $I^2$ are made around the upper part of the cylinder to allow the escape of air from within the cylinder, and when the plunger is forced down it will not drive air into the siphon-pipe. From the lower end of the cylinder a pipe connects with or forms a continuation with the discharge-nozzle H, so that when the plunger is forced down by pulling upon the lever L the water beneath it will be suddenly discharged through the jet-pipe H, thus filling the siphon partly by its own supply and partly by its action as an injector drawing water from the main supply in the tank and causing it to act and discharge the tank. The tank having been discharged the float C will sink, the valve in the supply-pipe will be opened, and the tank will again fill in readiness for another operation. It will be noted in this action that the jet-pressure is always approximately the same, because it depends upon the pull on the lever, which is a manual operation, as in contradistinction from a jet charged from a supply-main having a variable pressure. This starts the siphon noiselessly. When the piston I has thus been forced down, water is forced from its cylinder as well as drawn from the main tank, and the pressure thus brought upon the piston holds it down until all the water has been discharged. When the plunger is at the top of the cylinder, the bottom of it is above and essentially flush with the holes $I^2$, and when the plunger is pressed down it expels any air bubbles or globules which adhere to the bottom of the plunger or in other ways collect at that point. This is important, since it is necessary to have the plunger acting in solid water and to force only solid water into the siphon-leg. If any air were forced over, it would tend to interrupt the siphon-suction. When the plunger is forced down to the bottom of the cylinder, the siphon starts and the water lowers in the tank; but the suction caused by the partial vacuum at the jet-nozzle, induced by the water going over the siphon, acts to hold the plunger down against the returning-spring or counterweight, which is so balanced that it will not overcome this suction. When the level of the water in the tank reaches line of vent-holes in the siphon, air is then admitted gradually to the siphon, and this gradually decreases the partial vacuum and finally allows the gentle release of the plunger, which moves gently up to the original line of the vent-holes $I^2$ in the upper end of the cylinder. The remaining water in the bottom of the cylinder is then cleared out by the suction still acting in the jet-pipe, and when this occurs the air is drawn in through the vent-holes of the cylinder in addition to that which passes through the vent-holes of the siphon-leg, so that the final break caused by the admission of air actually comes through the cylinder and is thus muffled so as to prevent the loud gurgling noise that would take place if the water-level reached the bottom of the siphon-leg and admitted the air at that point. The action of the holes in the siphon-leg is then to gradually reduce the suction and allow the plunger to return without jar to its position of rest. Then when it is in this position the air, which finally breaks the siphon, passes through the cylinder holes and passages interiorly into the siphon-leg and is thus unheard. The cylinder and passages are thus practically empty on account of the suction action described and the return of the plunger, so as to open the cylinder-vents above the water-line. The tank then refills by the opening of the float-valve and water refills the cylinder and passages by both jet and cylinder openings, the body of air escaping through the cylinder-vents, except such globules as in practice will remain beneath the plunger, as before alluded to.

The noiselessness of this mechanism depends on the combination of the devices above explained, and in addition the fit of the plunger produces a noiseless water-cushion on the sudden downstroke, while the vent-holes in the siphon-leg allow of a noiseless return of the plunger to its normal position, after which the cylinder vent-holes allow the cylinder to clear itself and to break the siphon by the internal admission of air through the cylinder and the connecting-pipes into the siphon-leg.

Having thus described my invention, what I claim as new, and desire to secure by Letters Patent, is—

1. In a flushing-tank of the character described, a siphon-pipe having one end connected with the discharge-pipe and the other end terminating interior to the tank and near the bottom, holes made around and above the bottom of said pipe, a cylinder having open connection with a jet-nozzle which stands axially within the interior leg of the siphon, a plunger freely movable within the cylinder, and connections by which the plunger may be forced down to charge and start the siphon, a counterbalance-weight of less power than the suction produced by the siphon, whereby the plunger remains at the bottom of the cylinder until the water in the tank is low enough to expose the openings above the bottom of the siphon-leg.

2. In a flushing-tank of the character described, a siphon having the outer end connected with the discharge-pipe, the inner end provided with a series of perforations and a sleeve by which the number and position of the perforations exposed may be controlled, a jet-nozzle opening axially into the lower end of this siphon-leg, a cylinder having a plunger movable therein and a passage connecting the lower part of the cylinder with a jet-nozzle, a pull connection with the plunger whereby the latter may be forced to the bottom of the cylinder and water forced through the siphon to start the flow whereby the suction produced serves to retain the plunger at the bottom of the cylinder until sufficient air is admitted through the holes in the siphon-leg to release the plunger and allow it to return to the top of the cylinder, and holes made around the top of the cylinder below the bottom of the plunger when in its raised position whereby air is admitted to complete the discharge of water from the cylinder and to finally break the siphon.

3. In an apparatus of the character described, a siphon having the outer end connected with a discharge-pipe, and holes made in the inner portion above the lower end for the admission of air when the water reaches that point to reduce the suction of the siphon, a cylinder with open connection between its bottom and a jet-tube which extends axially upward in the inner leg of the siphon, a plunger freely movable within the cylinder and means for depressing it whereby water is first forced into the siphon to start the flow, said plunger being retained at the bottom of the cylinder by the suction thus produced until air is admitted through the openings in the siphon-leg, a counterbalance-weight connected with the plunger whereby the latter is slowly raised to its normal position when the admission of air through the siphon-leg has reduced the suction to less than the force of the counterweight, and a series of openings around the upper part of the cylinder opening thereinto below the plunger when the latter is in its raised position whereby air is admitted to clear the cylinder and finally break the siphon from the interior.

4. In an apparatus of the character described, a siphon with perforated leg and adjusting-sleeve, a cylinder having a plunger therein and a jet-tube connection between the cylinder and siphon-leg, manually-operated mechanism for depressing the plunger, and a counterweight by which the plunger is again raised when relieved of pressure, and perforations around the periphery of the cylinder beneath the plunger when in its raised position whereby air is admitted to finally and completely break the siphon from the interior and without exposing the bottom of the siphon-leg.

In witness whereof I have hereunto set my hand.

EDGAR B. BADLAM.

Witnesses:
A. J. HENRY,
H. HOFFMAN.